United States Patent [19]

Meeder

[11] 4,438,335
[45] Mar. 20, 1984

[54] DETECTOR HEAD MOUNTING APPARATUS

[75] Inventor: Raymond L. Meeder, Palos Heights, Ill.

[73] Assignee: Siemens Gammasonics, Inc., Des Plaines, Ill.

[21] Appl. No.: 298,635

[22] Filed: Sep. 2, 1981

[51] Int. Cl.³ .......................... G01T 1/20; G21K 1/02
[52] U.S. Cl. .................................. 250/363 S; 378/148; 378/149
[58] Field of Search ............................ 250/363 S, 505; 378/148, 197, 149; 248/123.1, 292.1

[56] References Cited

U.S. PATENT DOCUMENTS

| | | | |
|---|---|---|---|
| 3,011,057 | 11/1961 | Anger . | |
| 3,732,419 | 5/1973 | Kulberg et al. . | |
| 3,756,549 | 9/1973 | Lange | 248/123.1 |
| 3,984,689 | 10/1976 | Arseneau | 250/363 S |
| 4,216,381 | 8/1980 | Lange | 250/363 S |
| 4,223,222 | 9/1980 | Gray et al. | 250/363 S |
| 4,365,343 | 12/1982 | Grady et al. | 378/197 |

FOREIGN PATENT DOCUMENTS 54-154388 12/1979 Japan .............................. 250/363 S

*Primary Examiner*—Alfred E. Smith
*Assistant Examiner*—Carolyn E. Fields
*Attorney, Agent, or Firm*—Karl F. Milde, Jr.

[57] ABSTRACT

A mechanism is provided for mounting a detector head including a collimator onto supporting structure of a radiation detector for rotation about a selected one of a plurality of trunnion axes, the selection being made so that rotation occurs about the trunnion axis which passes nearest to the center of gravity of the head. A first rotatable member is mounted to the supporting structure for rotation about a first trunnion axis and a second rotatable member is mounted to the first rotatable member for rotation about a second trunnion axis. A key mounted on the first rotatable member shifts between protrusion into a first key slot located on the supporting structure and a second key slot located on the second rotatable member. The shifting mechanism is locked when the detector head is in a position other than a collimator changing position.

4 Claims, 10 Drawing Figures

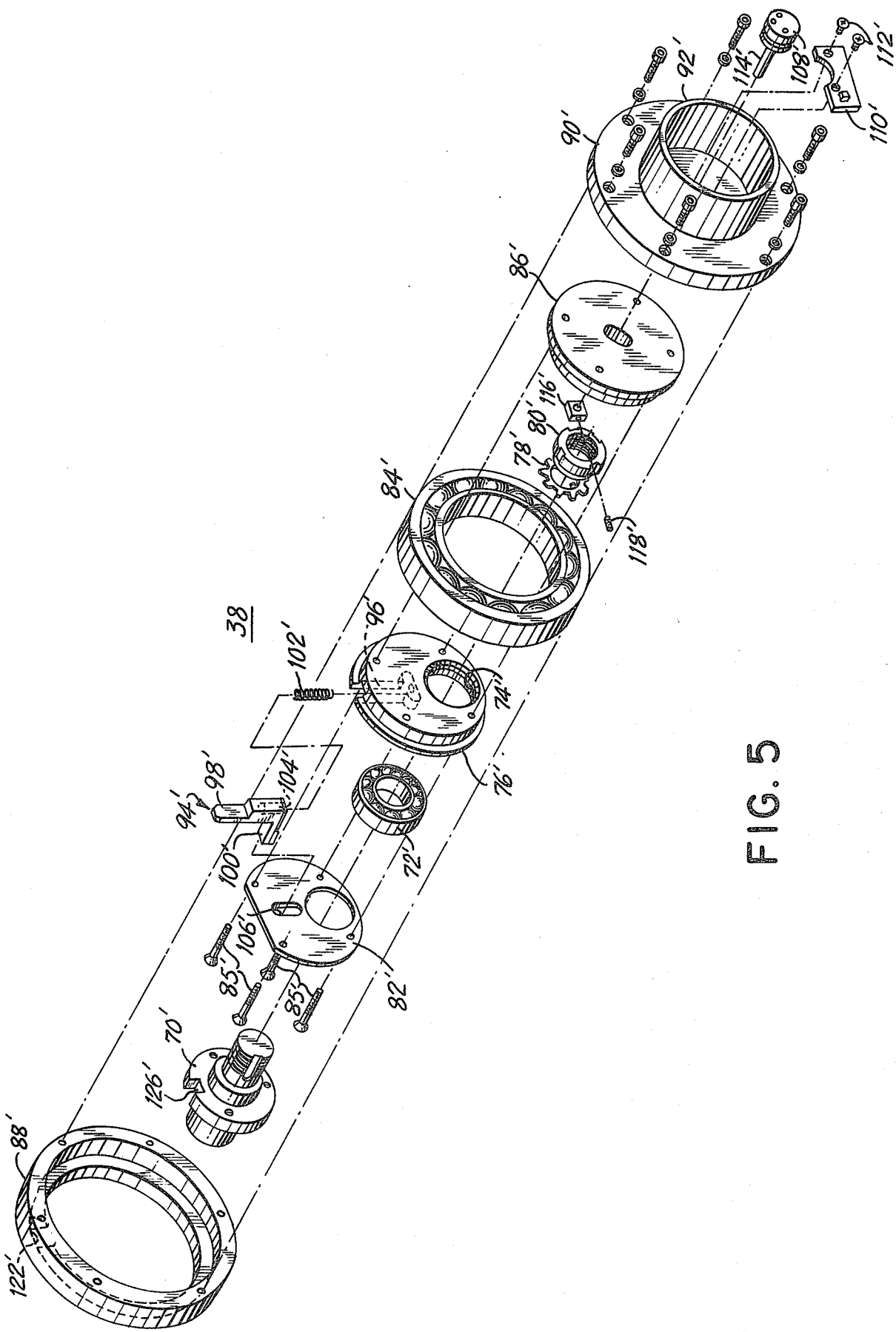
F I G. 5

DETECTOR HEAD MOUNTING APPARATUS

BACKGROUND OF THE INVENTION

1. Field of the Invention

This invention relates to apparatus for mounting a detector head including a collimator onto the supporting structure of a radiation detecting device used for medical diagnostic purposes.

2. Description of the Prior Art

Radiation detectors, such as nuclear radiation detectors like scintillation cameras, are widely used to develop information for medical diagnostic purposes based on signals derived from a source of radiation. Such radiation detectors are used in noninvasive medical diagnostic procedures wherein a head of the detector pivotally mounted onto supporting structure is positioned to face a part of the patient under study (e.g. a body organ) at all times. A commonly used radiation detector for such purposes is an Anger-type scintillation camera (named for its inventor), the basic principles of operation of which are disclosed in U.S. Pat. No. 3,011,057; 3,732,419 and 3,984,689. The radiation detector computes the distribution of the radiation emitting substance previously ingested by the patient as detected by the detector head from its viewing position, and analyzes this data to produce diagnostic information about the object of study. This is done by determining the distribution of the radiation emitting substance in the human body organ by analyzing the locations of scintillation events which occur on a scintillation crystal due to rays incident from the body organ. The Anger camera and other radiation detectors typically employ a radiation collimator between the radiation sensitive transducer (e.g. the crystal in the Anger camera) and the source of radiation.

The purpose of using a radiation collimator is to provide radiation transmissive passageways to ensure a mapping correspondence between respective elemental volumes of the radiation source (e.g. the Anger camera crystal). The most commonly used collimator is of a multi-channel type which comprises a number of radiation transmitting apertures or channels separated from each other by radiation opaque walls or septa. The collimator ensures that only rays traveling parallel to the radiation transmitting channels of the collimator will be transmitted from the patient to the radiation transducer; the passage of other rays will be blocked. The choice of collimator to be used with the detector head in a particular medical diagnostic procedure, depends on the energy level of the radiation emitting substance being used.

It is well known that radiation collimator design involves basically the parameters of aperture size and shape, septal thickness, and aperture length. These are the parameters which determine the resolution and the efficiency of the collimator for radiation (e.g. gamma rays) of a particular energy. In general, the septal thickness, which is the thickness of the walls separating adjacent collimating apertures, is chosen in accordance with the energies of the rays to be collimated so that the collimator will block the rays which enter the collimator at an angle and location such that they would otherwise traverse the wall between two apertures. Thus, the septal thickness must be relatively large for collimators used with high energy radiation sources, but for low or medium energy sources the septum or wall between the apertures may be quite thin. It is desirable to employ only the septal thickness actually required for the radiation energy involved in order to avoid unecessary loss of efficiency.

The supporting structure for a radiation detector, such as an Anger-type scintillation camera, generally includes a base on which is located a height-adjustable support arm having a yoke between the bifurcated ends of which is received the detector head. The head is positioned in the yoke so that it may be oriented into a desired position relative to the patient. The detector head, including a collimator selected for the intended application of the detector, is pivotally mounted onto the supporting structure for rotation about a single trunnion axis running through the respective pivot points of attachment of the head to the respective ends of the yoke. Brake or other locking means is provided to fix the position of the head relative to the supporting structure yoke after the desired positioning has been achieved. For ease of adjustment and greater patient safety, it has been found advantageous to mount the detector head onto the supporting structure so that the trunnion axis about which the head rotates coincides with the center of gravity of the head including the collimator. Such balancing is especially desirable where the supporting structure is adapted to rotate the head to provide emission computerized tomography (ECT), in which the detector head precesses about the patient to produce a display showing the radioactive distribution in the object of study in a number of parallel section imaging planes. Prior art structure mounting the detector head for emission computerized tomography is disclosed in U.S. Pat. No. 4,216,381. Commonly assigned, copending application Ser. No. 273,446 filed June 15, 1981, now U.S. Pat. No. 4,417,143, by Haas, et al., entitled "Improved Apparatus for Driving a Radiation Detector" shows newly proposed supporting structure mounting the detector head for ECT application.

A disadvantage of existing mechanisms for mounting a detector head relative to supporting structure of a radiation detector, wherein the detector head is mounted for pivotal movement about a single trunnion axis, is the inability to maintain the detector head in a balanced configuration for different weight collimators. Low energy collimators, for example, may be approximately 80 lbs. lighter than medium energy collimators. Thus, where a detector head including a collimator is pivotally mounted onto the supporting structure of a radiation detector so that the center of gravity of the head is coincident with the single trunnion axis, changing collimators can result in an unbalanced detector head because of the weight differential for different collimator types. An unbalanced head is undesirable for operational ease and patient safety reasons.

SUMMARY OF THE INVENTION

It is an object of the present invention to provide a mechanism for pivotally mounting a detector head including an interchangeable collimator onto supporting structure of a radiation detector so that the head is maintained in a balanced condition when the collimator is interchanged.

It is another object of the invention to provide a mechanism for mounting a detector head including an interchangeable collimator onto supporting structure of a radiation detector for rotation about a selected one of a plurality of trunnion axes, the selection being made so that rotation occurs about the trunnion axis which passes nearest to the center of gravity of the head.

Another object of the invention is to provide automatic shifting of the position of the axis of rotation of a detector head including an interchangeable collimator with respect to supporting structure of a radiation detector in response to placing the collimator onto the head.

A further object of the invention is to provide a method for shifting the trunnion axis of a detector head including an interchangeable collimator about which the head moves relative to supporting structure of a radiation detector wherein the shifting mechanism is locked when the detector head is in a position other than a collimator-changing position.

In accordance with one aspect of the invention, apparatus is provided for pivotally mounting a detector head including a collimator onto supporting structure of a radiation detector comprising means for mounting the head onto the supporting structure for rotation about a selected one of a plurality of trunnion axes. The selection of the axis about which the detector head rotates is made so that the head will rotate about the axis which passes nearest to the center of gravity of the head (including the collimator).

In a preferred embodiment described in detail below, the means for mounting the head onto the supporting structure comprises first and second rotatable members, the first rotatable member being mounted to the supporting structure for rotation about a first trunnion axis and the second rotatable member being mounted to the first rotatable member for rotation about a second trunnion axis. A key mounted on the first rotatable member is spring-biased into a position of protrusion into a key slot located on the detector head supporting structure so that for low energy collimators rotation of the detector head (including the collimator) will be about the second trunnion axis. A heavier collimator, however, such as a medium energy collimator, placed on the detector head will move the key against the bias out of the key slot in the supporting structure and to a position protruding into a second key slot located in the second rotatable member. This locks the rotation of the second member relative to the first member while freeing the first member for rotation about the first trunnion axis relative to the supporting structure. The configuration of the mechanism is such that the second trunnion axis passes close to the center of gravity of the detector head including a low energy collimator and the first trunnion axis passes near the center of gravity of the detector head and a heavier medium energy collimator.

In another aspect of the invention, the relative positions of the key and key slots are arranged so that shifting of the detector head between a position for movement around the first and second trunnion axes can occur only when the detector head is pivoted into a collimator-changing position. This prevents the inadvertent shifting between axes when the head has been rotated away from the collimator-changing position into an operating position facing a patient.

There have thus been outlined rather broadly certain objects, features and advantages of the invention in order that the detailed description that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including all such equivalent arrangements that encompass the spirit and scope of the invention.

BRIEF DESCRIPTION OF THE DRAWINGS

An embodiment of the invention has been chosen for purposes of illustration and description, and is shown in the accompanying drawings forming a part of the specification, wherein

FIG. 5 is an exploded perspective view showing the right-hand components of the mounting apparatus of FIG. 1.

Throughout the drawings, like elements are referred to by like numerals.

DESCRIPTION OF THE PREFERRED EMBODIMENT

Figure 1:
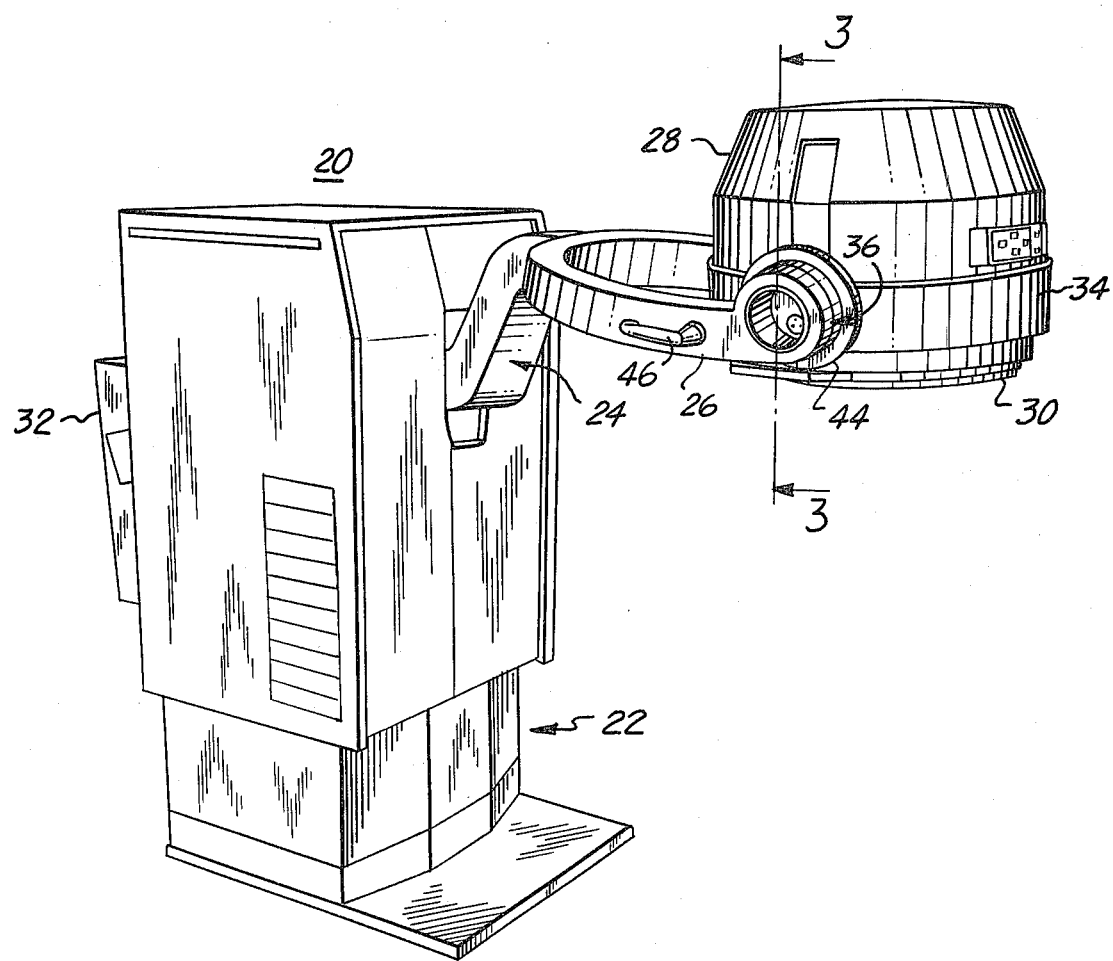
FIG. 1 is an overall perspective view showing a detector head including a collimator pivotally mounted by means of apparatus in accordance with an embodiment of the present invention onto supporting structure of a radiation detector.

For illustrative purposes, a preferred embodiment of the invention is described as implemented to pivotally mount a detector head onto supporting structure of an Anger-type scintillation camera which is adapted for emission computerized tomography (ECT), such as described in the commonly-owned, U.S. Pat. No. 4,417,143 of Haas et al., entitled "Improved Apparatus for Driving a Radiation Detector", which was filed June 15, 1981. As shown in FIG. 1, the Anger-type camera 20 includes a base 22 on which is mounted a support arm 24 including a yoke portion 26. A detector head 28, including a collimator 30 is pivotally mounted between the bifurcated ends of the yoke 26. A counterweight 32 is carried at the end of the support arm 24 opposite to the yoke portion 26 and serves the purpose of balancing the moment of the weight of the detector head 28 about the point of attachment of the support arm 24 to the base 22. As described in U.S. Pat. No. 4,417,143, the arm 24 is mounted atop the base 22 to drive the detector head 28 in a precessing orbit about a patient (for example, about the cranial-caudal axis of the patient), with the detector head 28 locked in a preset pivotal position with respect to the yoke 26 for desired orientation of the face of the head 28 with respect to the patient.

Figure 2:
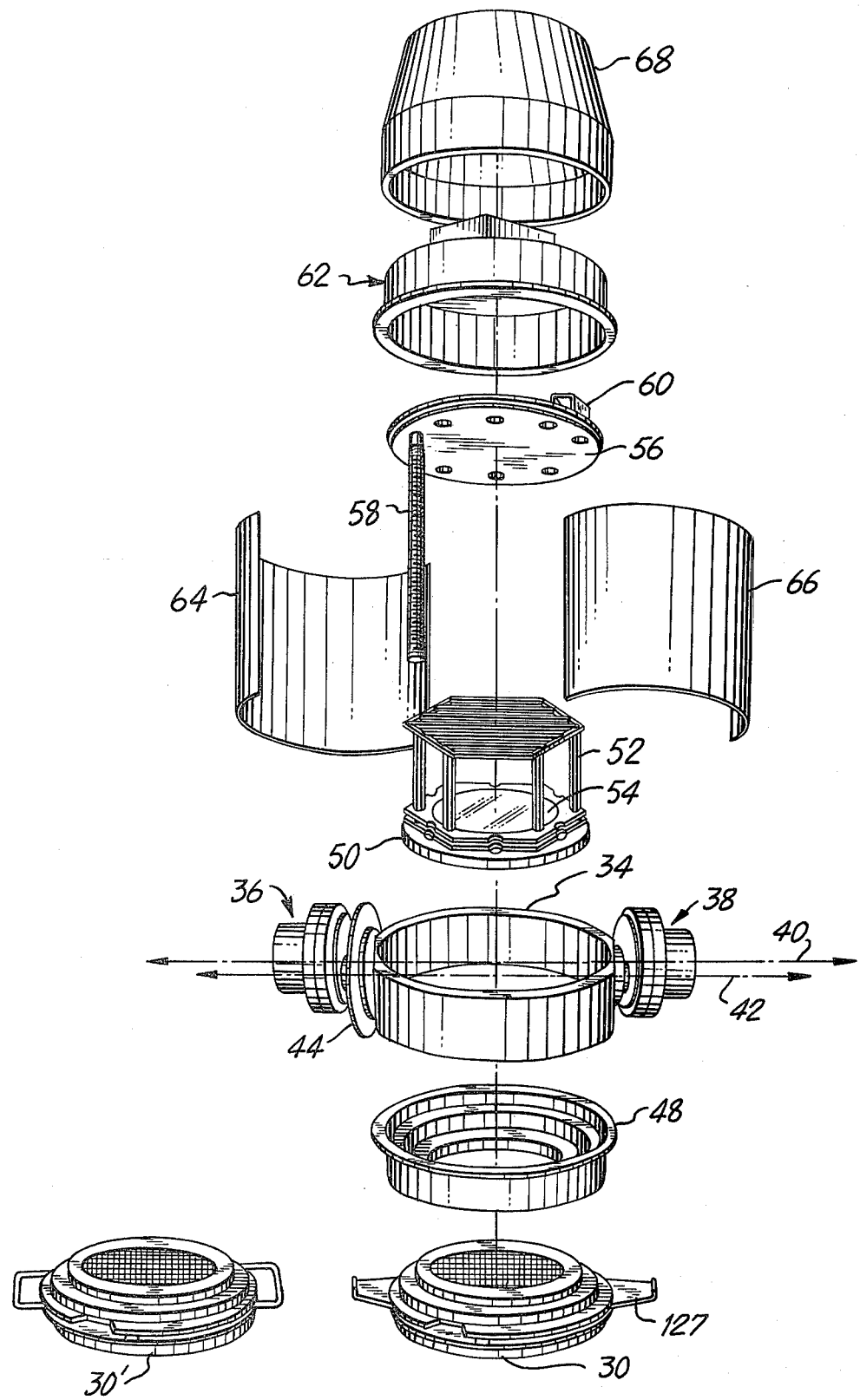
FIG. 2 is an exploded view showing the components of the detector head of FIG. 1.

The elements of the detector head 28 are shown in FIG. 2. The detector head includes a trunnion ring 34 which is pivotally mounted between left-hand and right-hand mounting assemblies 36 and 38 for rotation about a selected one of a first trunnion axis 40 and a second trunnion axis 42, in a manner described in greater detail below. A disc-brake 44 on the left-side of the trunnion ring 34 provides means for locking the pivotal position of the detector head 28 with respect to the yoke 26 after the head has been brought to the desired orientation. Brake pad calipers hand-operated by a handle 46 (FIG. 1) are mounted in a well-known way on the yoke portion 26 of the supporting structure to grasp the disc-brake 44. As shown in FIG. 2, below and attached to the trunnion ring 34 is a round collimator housing shield 48 below which any one of a plurality of interchangeable collimators 30, 30' can be affixed. Radiation travelling from a body organ of the patient under study passes through the apertures of the collimator 30 and impinges upon the surface of a scintillation crystal 50 positioned within the detector head. Above the scintillation crystal 50 is located a platform 52 which serves as a support frame for a hexagonal array of photomultiplier tubes (not shown) which receive light emitted through a light pipe 54 from scintillation events which occur in the crystal 50 due to the impinging radiation. A round detector top cover 56 fastened to the platform 52 by threaded bolts 58 provides a covering to protect the photomultiplier tubes. A shielded cable opening 60 provides a passageway for wires (not shown) which carry electrical signals from the photomultiplier tubes to detector processing circuitry located within a round processor cover tub assembly 62. Side shields 64 and 66 and a top cover 68 complete the detector head asembly.

Figure 3:
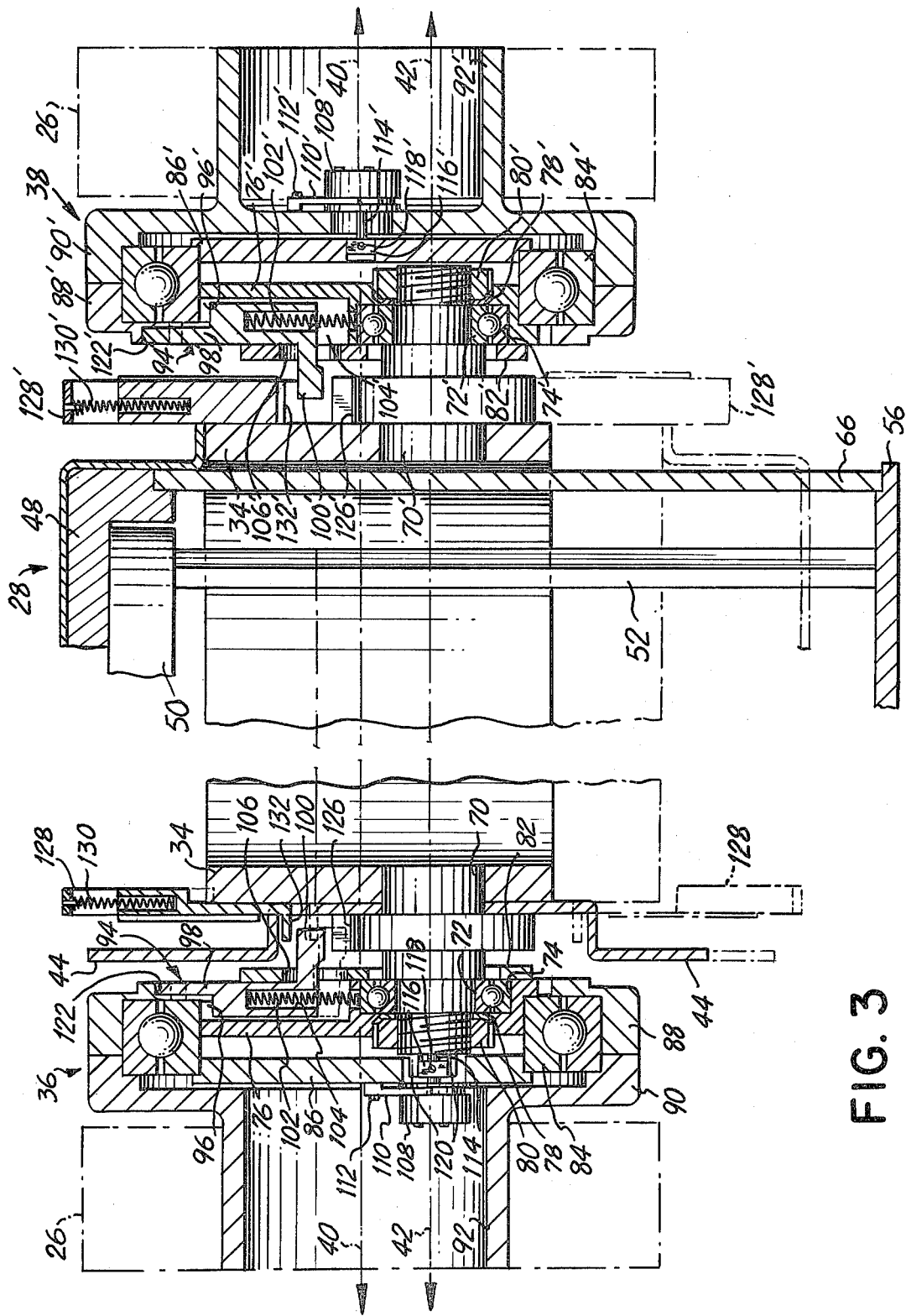
FIG. 3 is a section view taken along the plane 3—3 FIG. 1.
Figure 4:
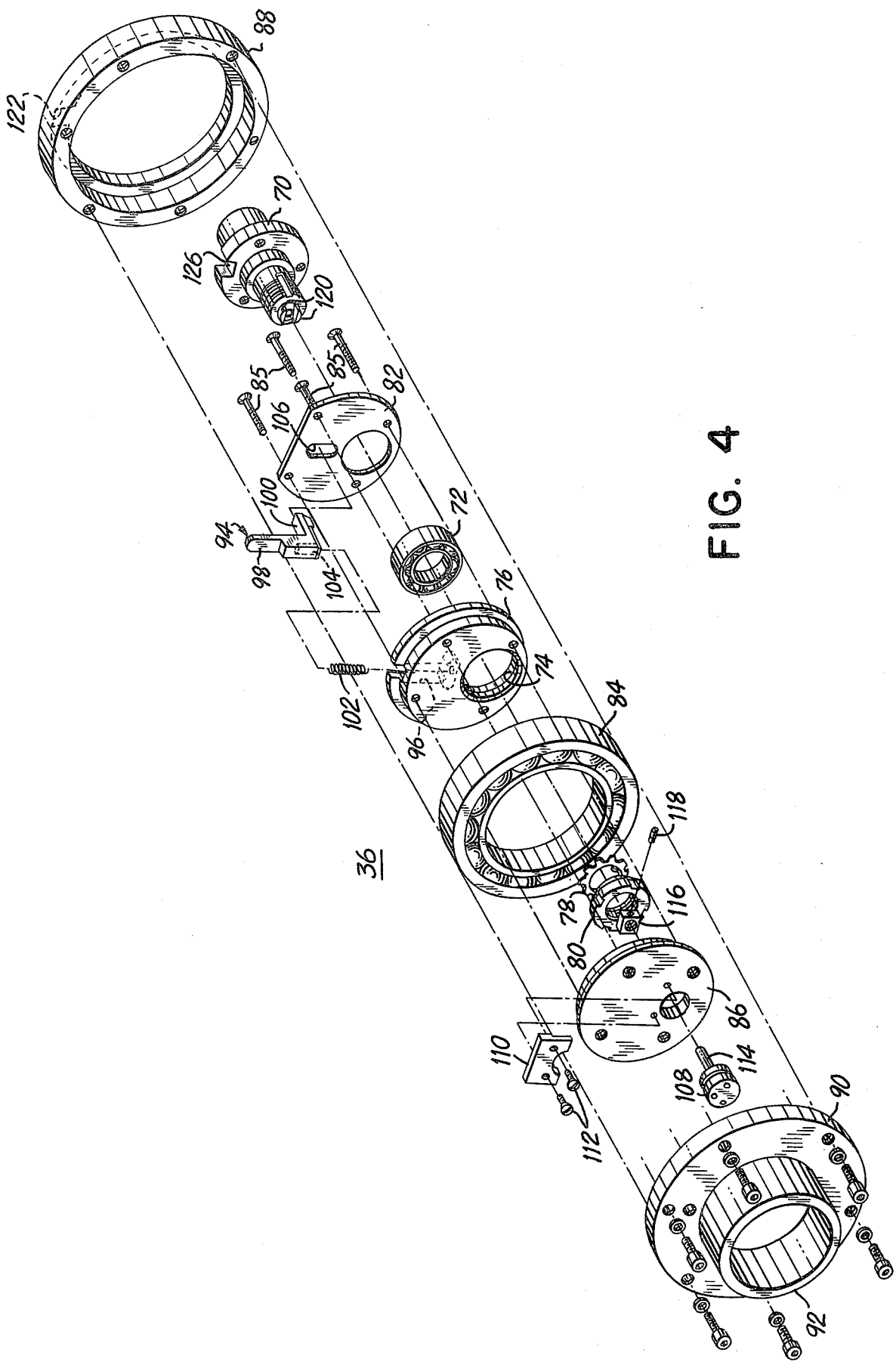
FIG. 4 is an exploded perspective view showing the left-hand components of the mounting apparatus of FIG. 1.

The details of the mechanism for mounting the detector head 28 onto the yoke portion 26 for rotation about a selected one of the first trunnion axis 40 and the second trunnion axis 42 are shown in FIGS. 3-5.

The left-hand assembly shown in FIGS. 3 and 4 includes a rotatable member in the form of a trunnion shaft 70 onto which the trunnion ring 34 of the detector head 28 is fastened. The opposite end of the shaft 70 is received within the inner race of a small radial ball bearing assembly 72 which sits within a recess 74 of another rotatable member in the form of a bearing retainer housing 76. The left end of the shaft 70 (FIG. 4) is externally threaded so that the shaft 70 can be secured to the inner race of the bearing 72 by means of lock washer 78 and lock nut 80. The outer race of the bearing 72 is secured within the recess 74 of the retainer housing 76 by means of a bearing retainer plate 82 fastened to the housing 76. The rotatable member 76 is received within the inner race of a large radial ball bearing assembly 84 and is secured therein by means of attachment with fasteners 85 to a left clamp plate 86. The outer race of the bearing 84 is set into a recess between bearing housing members 88 and 90. The member 90 includes a projecting sleeve portion 92 which is received into the openings of the yoke portion 26 of the support arm 24 (indicated in phantom in FIG. 3).

A key 94 is mounted in a longitudinal recess 96 of the bearing retainer housing 76 and is secured therein by the retainer plate 82. The key 94 has a stepped post portion 98 and a transverse base portion 100. A spring 102 positioned within the recess 96 of the rotatable member 76 protrudes into a cavity 104 opening onto the underside of the post portion 98 of the key 94. The spring 102 serves to bias the key 94 into a position with the base portion 100 located at the top of an opening 106 in the bearing retainer plate 82 through which the key protrudes. The recess 96 in the retainer housing 76 is shaped to accommodate the key 94 for movement along its longitudinal axis and to allow for positioning of the spring 102.

A potentiometer 108 is secured by means of a clamp 110 to the left clamp plate 86 by means of screws 112.

The protruding post 114 of the potentiometer 108 is received into a hexagonal nut 116 and secured therein by means of a set screw 118. The nut 116 is gripped for rotation with the left trunnion shaft 70 between the projections 120 on the left end of the shaft 70. The bearing housing member 88 includes a key slot 122 into which the top of the post portion 98 of the key 94 is received when the key 94 is in its normal position.

When the post portion 98 is in the key slot 122, the rotatable member 76 is locked against rotation relative to the housing member 88 (i.e. relative to the camera supporting structure). However, when the key 94 is in its normal position, the base portion 100 is clear of another key slot 126 formed on the rotatable member or trunnion shaft 70. Thus, the trunnion shaft 70 is freed for movement about the trunnion axis 42, but fixed against movement about the trunnion axis 40 (see FIGS. 2 and 3). When the key 94, however, is urged against the bias of the spring 102 so that the top of the post portion 98 of the key 94 is moved out of the key slot 122, but the bottom of the transverse portion 100 of key 94 is moved into the key slot 126, the retainer housing 76 is freed for movement relative to the bearing housing member 88, but the shaft 70 is locked against movement relative to the bearing housing 76. Thus, the detector head 28 can rotate about the axis 40, but not about the axis 42.

As seen in FIG. 3, a spring biased slide member 128 is mounted on the detector head 28 to protrude outwards vertically on the side of the head which receives the collimator 30. When a medium energy collimator 30 is placed on the detector head a lateral extension 127 (FIG. 2) comes into contact with the top of the slide member 128 and exerts a downward force against the bias action of a spring 130 which biases the slide member 128. If the force exerted opposite to the biasing force of the spring 130 is great enough, the slide member is moved down so that its base 132, which is in contact with the top of the transverse portion 100 of the key 94, forces the key 94 down against the bias of the key spring 100 (as shown by dot-and-dash lines in FIG. 3). The construction of the slide member 128 and the key 94 and the selection of the springs 102 and 130 is made so that the key 94 moves down out of the key slot 122 and into the key slot 126 when a collimator 30 is attached onto the detector head 28 which shifts the center of gravity of the detector head including the collimator to a point which more closely coincides with the trunnion axis 40, than with the trunnion axis 42. For a low-energy collimator 30', wherein the center of gravity of the detector head including the collimator lies more nearly coincident with the trunnion axis 42, the placement of the collimator 30' will not cause a force to be exerted by the slide member 128 against the key 94 sufficient to move the key out of the key slot 122 and into the key slot 126. As described on page 20, the interchangeable collimators 30, 30' are advantageously constructed so that the lower weight (i.e. low energy) collimator 30' does not contact the slide member 128 at all, and thus no shifting force is exerted on the key 94 by the collimator 30'.

When it is desired to change the collimator on the detector head 28, the detector head 28 is brought into a position with the slide member 128 and the collimator 30 facing upward, as shown by the solid lines in FIG. 3. After the collimator is interchanged, the head 28 is rotated away from this collimator-changing position to an operation position, such as shown by the dot-and-dash lines in FIG. 3. Since rotation of the detector head 28 away from the collimator-changing position moves the key 94 out of a position of alignment with both of the key slots 122 and 126, there can be no shifting of the key 94 between the key slots 122 and 126. This feature prevents inadvertent shifting of the detector head from a posture of rotation about one trunnion axis to a posture of rotation about the other trunnion axis.

The components of the right-hand mounting assembly 38 (FIG. 5) are similar to those of the left-hand mounting assembly 36 (FIG. 4) and a description of elements which are the same will thus not be repeated. Elements of the right-hand assembly that correspond to elements 70–130 of left-hand assembly 36 are identified by corresponding reference numerals 70′–130′. It should be noted, however, that the right-hand potentiometer 108′ in FIG. 5, is mounted to monitor rotation of the detector head about the trunnion axis 40; whereas, the left-hand potentiometer 108 in FIG. 4 is mounted to monitor rotation around the trunnion axis 42. This is accomplished in that the nut 116′ is gripped by the disc plate 86′ rather than by the trunnion shaft 70′.

Figure 6A:
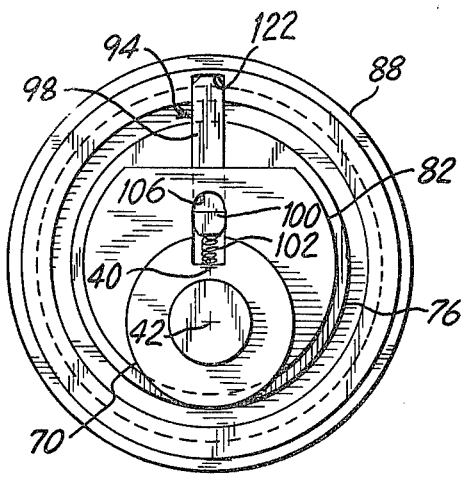
FIGS. 6a–6e are schematic representations useful in understanding the principles of operation of the mounting apparatus of FIG. 1.
Figure 6B:
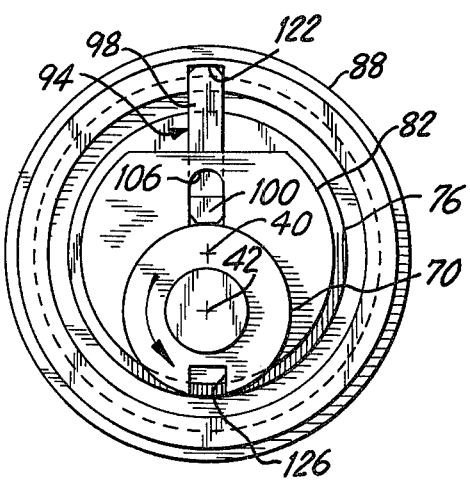
Figure 6C:
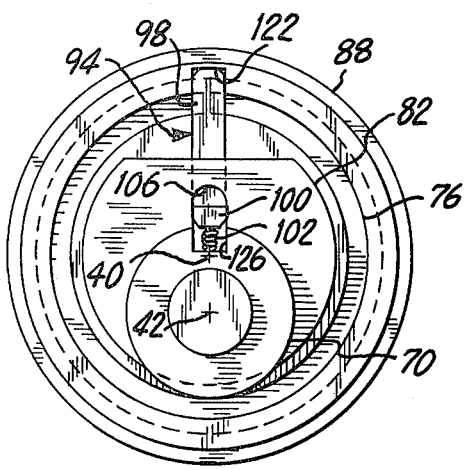

Operation of the mechanism can be understood with reference to FIGS. 6a–6e. FIGS. 6a and 6c show the key 94 spring-biased by the spring 102 into its neutral position with the post portion 98 protruding into the key slot 122 of the bearing housing member 88. If a low-energy 30′ collimator, for example, is placed on the detector head lying in the collimator-changing position (shown by solid lines in FIG. 3), the force exerted on the slide member 128 against the bias of the spring 130 is not sufficient to move the key 94 into the key slot 126 on the trunnion shaft 70. Thus, as illustrated in FIG. 6b, the detector head 28 including the collimator is rotatable about the trunnion axis 42, the shaft 70 being freed to move with the inner race of the small bearing 72 relative to the outer race of the bearing 72 and the bearing retainer housing 76. Since, however, the post portion 98 of the key 94 remains urged into the key slot 122 of the bearing housing member 88, rotation of the bearing retainer housing 76 with the inner race of the large bearing 84 is prevented relative to the bearing housing member 88 and the outer race of the bearing 84.

Figure 6D:
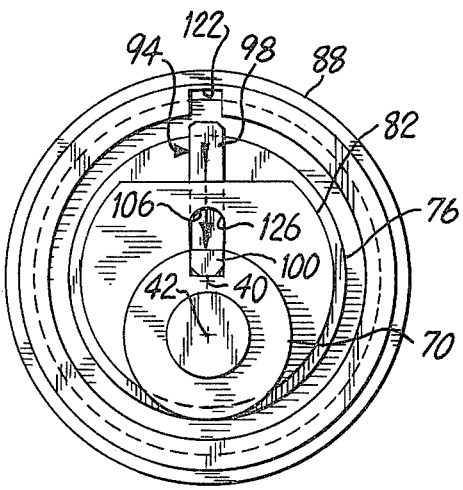
Figure 6E:
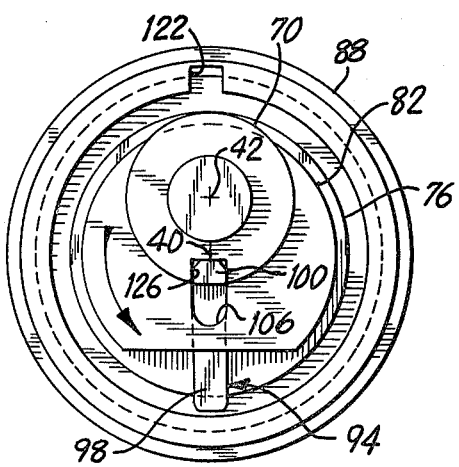

In FIG. 6d, a medium energy collimator 30 has been placed on the detector head 28 so that its ear 127 exerts a force on the slide member 128 which is sufficient to drive the key 94 from the key slot 122 into the key slot 126. As illustrated in FIG. 6e, since the transverse portion 100 of the key 94 is positioned within the key slot 126, movement of the inner race of the bearing 72 with respect to its outer race is prevented. Thus, the trunnion shaft 70 is locked against movement relative to the bearing housing 76. However, since the post portion 98 of the key 94 has been moved away from the key slot 122 of the bearing housing member 88, rotation of the bearing retainer housing 76 is permitted with respect to the bearing housing member 88. The detector head is thus freed to rotate about the trunnion axis 40. Thus, it can be seen that the selection of the collimator will automatically shift the detector head 28 from permissible rotation about the trunnion axis 42 to permissible rotation about the trunnion axis 40.

The structure may be designed so that the weight of the collimator causes the shift from one trunnion axis to another. However, the interchangeable collimators 30 and 30′ are more advantageously constructed so that the heavier collimators (for which trunnion axis shift from the normal axis 42 to the shifted axis 40 is desired) will have ears 127 (FIG. 2) which contact and depress the slide members 128; but the lighter weight collimators will not have such ears.

When a heavier (medium energy) collimator 30 is affixed to the head 28 while it is in the collimator-changing position, the extensions 127 (FIG. 2) are fitted under breech lugs (not shown) on the head 28. This ensures that the mechanism remains shifted for rotation about axis 42 even during the time that the head 28 is in the collimator-changing position. The lighter (low energy) collimator 30′ has no extensions 127 and so does not contact the sliding members 128, 128′. The mechanism thus remains in its normal position for rotation about the axis 30, inadvertent shifting during the time the head 28 remains in the collimator-changing position being prevented by the biasing force of springs 102, 102′, 130 and 130′ (FIG. 3).

The apparatus thus described provides a mechanism for maintaining the balance of the detector head 28 for rotation between the ends of the yoke portion 26 of the support arm 24 for different weights of collimator by causing a shift of the axis of rotation of the detector head. Selection of the one of a plurality of trunnion axes about which the detector head can rotate is made automatically by the placement of the collimator onto the detector head. The selection is made such that the selected axis is the one which most nearly coincides with the center of gravity of the detector head including the collimator. This provides for a structure which is easier to operate and is safer than prior art structures which have capability for rotation only about a single trunnion axis.

Having thus described the invention with particular reference to the preferred form of mechanism, it will be obvious to those skilled in the art to which the invention pertains, after understanding the invention, that various changes and modifications may be made therein without departing from the spirit and scope of the invention as defined by the claims appended hereto. Positional references of certain elements shown in the drawings (such as "left", "right", etc.) have been made throughout the specification merely to facilitate the explanation of the preferred embodiment, and such positional references should not be viewed as limiting the position which such elements may have in other embodiments. Similarly, it will be appreciated that dimensions, shapes and layout of the various elements can be varied to suit individual tastes and requirements.

What is claimed is:

1. Apparatus for pivotally mounting a detector head including a collimator onto supporting structure of a radiation detector comprising:
   means for mounting the head onto the supporting structure for rotation about a selected one of a first trunnion axis and a second trunnion axis; and
   means for selecting the axis about which the detector head can rotate whereby the head will be rotatable about the axis which passes nearest to the center of gravity of the head;
wherein the axis selecting means is activated by the weight of the collimator.

2. Apparatus for pivotally mounting a detector head including a collimator onto supporting structure of a radiation detector comprising:
   means for mounting the head onto the supporting structure for rotation about a selected one of a first trunnion axis and a second trunnion axis; and
   means for selecting the axis about which the detector head can rotate whereby the head will be rotatable about the axis which passes nearest to the center of gravity of the head;
wherein the head mounting means comprises
a first rotatable member;
a second rotatable member;
means mounting the first rotatable member to the suppporting structure for rotation about the first trunnion axis; and
means mounting the second rotatable member to the first rotatable member for rotation about the second trunnion axis; and
wherein the axis selecting means comprises means for alternately preventing movement of either the first rotatable member relative to the supporting structure or the second rotatable member relative to the first rotatable member; and wherein the supporting structure is formed to have a first key slot, the second rotatable member is formed to have a second key slot, and the axis selecting means further comprises a key mounted on the first rotatable member for alternate insertion into a selected one of the first and second key slots; and wherein the axis selecting means further comprises means biasing the key into a position within the first key slot; and a slider actuated by the weight of the collimator for opposing the bias and moving the key from a position within the first key slot to a position within the second key slot.

3. Apparatus as in claim 2, wherein the axis selecting means further comprises means preventing movement of the key between the first and second key slots unless the detector head is in a collimator changing position.

4. Apparatus as in claim 3, wherein the first rotatable member mounting means comprises a bearing element having an outer race connecting to the support structure and an inner race onto which the first rotatable member is received; and wherein the second rotatable member mounting means comprises a bearing element having an outer race connecting to the first rotataional member and an inner race onto which the second rotatable member is received, the detector head being mounted to the second rotatable member.

* * * * *